May 21, 1929.　　　C. O. WINGREN　　　1,713,939
CONTROL MECHANISM FOR FILM FEED
Original Filed Nov. 2, 1925

INVENTOR.
Charles O. Wingren
BY
ATTORNEY

Patented May 21, 1929.

1,713,939

UNITED STATES PATENT OFFICE.

CHARLES O. WINGREN, OF PASADENA, CALIFORNIA.

CONTROL MECHANISM FOR FILM FEED.

Application filed November 2, 1925, Serial No. 66,178. Renewed October 8, 1928.

My invention is particularly well adapted for use in connection with an endless film, or the like, which is wound upon the outside of a reel and unwinds from the inside of said reel, being looped down through a projecting machine after it leaves the inside of the reel and being returned to the outside of the reel after it has been projected, thus making it possible to run an endless film continuously as long as may be desired.

One of the serious difficulties in connection with the continuous running of an endless film as above indicated is to regulate the speed with which the film is taken out of the inside of the reel, and the object of my invention is to provide means for automatically regulating and controlling the feed of the film from the inside of the reel. I have conceived the idea of using the inner convolution of the film in the inside of the reel for controlling and regulating the speed with which the film is fed from the inside of the reel, that is, the inner convolution of the film is used to actuate the mechanism which controls the movement of the inner convolutions of said film. In machines of this character a reel of film is placed upon a turntable, being loosely placed thereupon so that it can be moved relative to said platform. This makes it possible to retard the rotative movement of the film upon said turntable, or to increase the rotative movement of the film upon said turntable. It is, however, only necessary to thus regulate certain of the inner convolutions of said film and I accomplish this in connection with my invention by providing a mechanism which will either speed up the inner convolutions of the film, or will operate a brake element and retard the revolutions of said inner convolutions.

In order to explain my invention more in detail, I have illustrated on the accompanying sheet of drawings a mechanism for accomplishing the above-named function, such mechanism being controlled in its operation by the innermost convolution of the film, and I will now describe this particular embodiment of the invention.

Referring now more in detail to the drawings, I will describe the particular embodiment of the invention used for illustrative purposes. A platform or turntable element 6, is provided, having a central hub-like portion, 6ª, on its under side. This is mounted to turn upon a trunnion 7, formed on a fixed frame composed of the members designated 14, said trunnion being bored to receive a central shaft, 8, therethrough, said shaft being adapted at its lower end, as at 9, to be connected with a driving means (not shown) and provided with a beveled gear, 10. At its upper end, said shaft 8, is provided with a film sprocket, 11, and with a beveled gear, 12, both secured thereto and turning therewith.

Figures 2, 4:
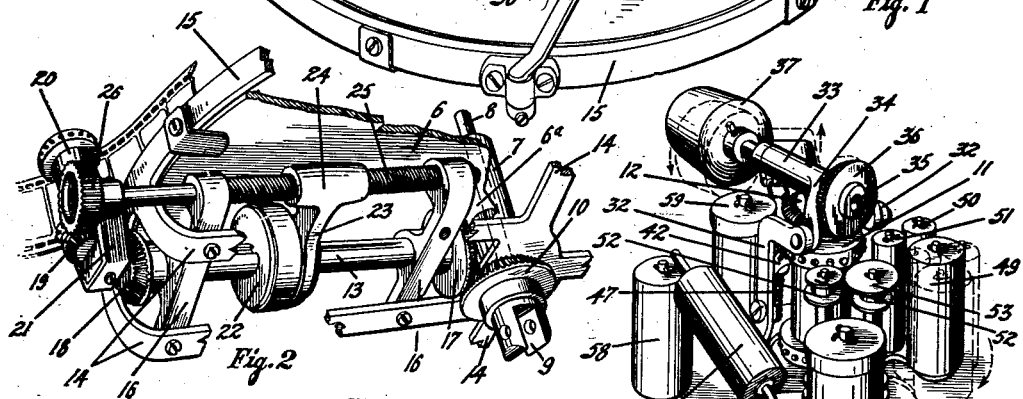
Figure 2 is a fragmentary, perspective view of the bottom of a turntable mechanism, showing a mechanism by means of which the speed of the turntable can be regulated.
Figure 4 is a view of a part of the mechanism from the opposite side.

Referring now to Fig. 2, a shaft 13, is mounted on the underside of the turntable, 6, and supported in the frame 14, from a fixed ring, 15, around the edge of said turntable, and in two cross members, 16, 16. The inner end of said shaft 13, is provided with a beveled gear, 17, in mesh with the beveled gear, 10, and its outer end is provided with a beveled gear, 18, which meshes with a similar gear, 19, for driving a second film sprocket, 20, supported in a fixed bearing frame, 21, as indicated, whereby as the central shaft 8, is driven, the two film sprockets, 11 and 20, are driven at the same speed. On said shaft 13, is movably mounted a friction drive wheel, 22, with a shifting yoke, 23, having a threaded sleeve, 24, on a screw shaft, 25, with its bearings in the cross members, 16, 16, and provided with a hand wheel, 26, whereby said friction drive wheel, 22, can be adjusted to different positions across the underside of the turntable 6, which is driven by said friction drive wheel 22, from the central shaft 8, the gears, 10 and 17, and the shaft, 13, on which said friction drive wheel is mounted with spline connection.

A reel of film, F, is shown mounted upon said turntable, 6, with one convolution passing around the film sprocket, 20, and held in engagement therewith by means of rollers, as 27 and 28, while the inner convolution of said film is guided around the inner film sprocket, 11, and up over the body of the film as indicated. Confining rollers, as 29, 29, mounted on adjustable or swinging arms, 30, 30, are provided for confining the outer convolutions of the film in compact form. These confining rollers and their adjustment constitute no part of the present invention and need not be shown more in detail. The driving mechanism as shown in Fig. 2, is also no particular part of the invention of this application and need not be described more than it has been, but inasmuch as the speed of the turntable and its regulation is used in connection with different films used on the mechanism, I have shown the mechanism and described its operation.

Figures 3, 5:
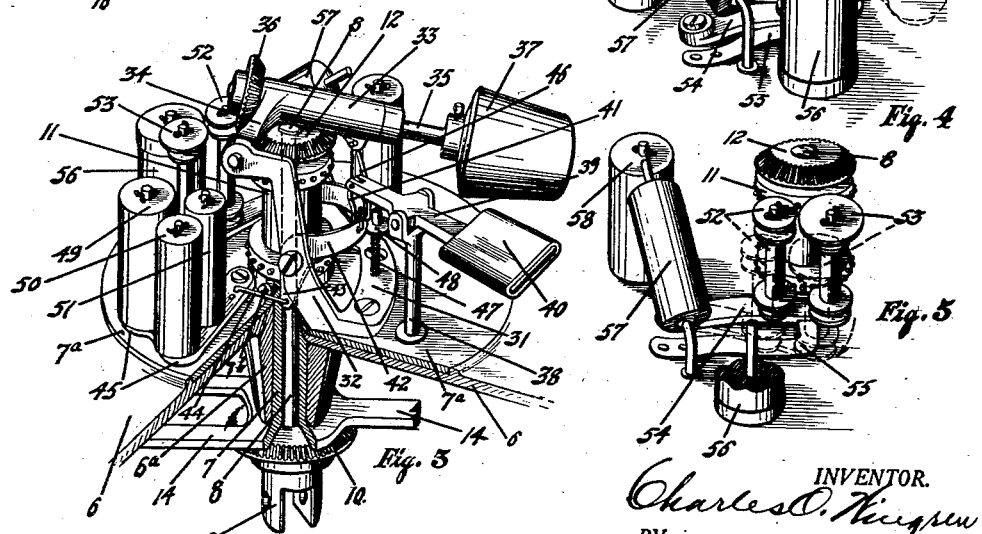
Figure 3 is a perspective view of one form of the mechanism embodying the invention.
Figure 5 is a perspective view of a part of said mechanism from another angle.

I will now describe the invention proper, referring particularly to Figs. 3, 4 and 5, in which a preferred or practical embodiment thereof is clearly illustrated.

Mounted upon a stationary center table, 7ª, seated in the turntable 6, and secured to the fixed trunnion 7, of the frame members, 14, by means of a set screw, 7ᵇ, is a supporting member or yoke having a base portion, 31, and two upwardly projecting arms, 32, 32. Mounted between the upper ends of said arms, 32, 32, is a sleeve bearing, 33, having the pivot arms, 34, 34, and having a shaft, 35, therethrough, said shaft being provided at one end with a beveled gear, 36, meshing with the gear, 12, on the upper end of the central drive shaft 8. On the outer end of said shaft 35, is adjustably mounted a tapered friction drive member, 37, of soft flexible material, and adapted to be moved into and out of engagement with the top edges of the inner convolutions of the film, F, for moving the same in a manner hereinafter again referred to.

Also mounted on said center table, 7ª, is a standard, 38, having a fork at its upper end, in which is pivotally mounted a brake lever, 39, having on its outer end a brake pad, 40, of suitable soft material, and adapted to be moved into and out of braking contact with the upper edges of the inner convolutions of said film, F, as again referred to. The inner end of this brake lever, 39, is connected by means of a link, 41, with a pivoted yoke, 42, pivoted between the arms, 32, 32, said yoke, 42, having at one end a downwardly extending finger, 43, connected by means of a link, 44, to a flat member, 45, pivotally mounted flatwise on said center table, 7ª, as indicated.

The bearing sleeve, 33, is also connected by means of a link, 46, to said pivoted yoke, 42, whereby as said yoke, 42, is moved downwardly, the brake lever pad, 40, is raised, while the friction drive member, 37, is moved downwardly into contact with the film F. When said yoke, 42, is raised, the action is reversed, and the brake lever pad is moved down upon the film, and the drive member, 37, is raised from said film. Mounted on the base, 31, is a vertical pin and coiled spring, designated as a whole, 47, with a washer bearing member, 48, bearing yieldingly upwardly on said pivoted yoke, 42, for the purpose of balancing said brake lever and said drive member, 37, and holding them normally and yieldingly out of engagement with the film, when said film is running correctly off of the reel.

Figure 1:
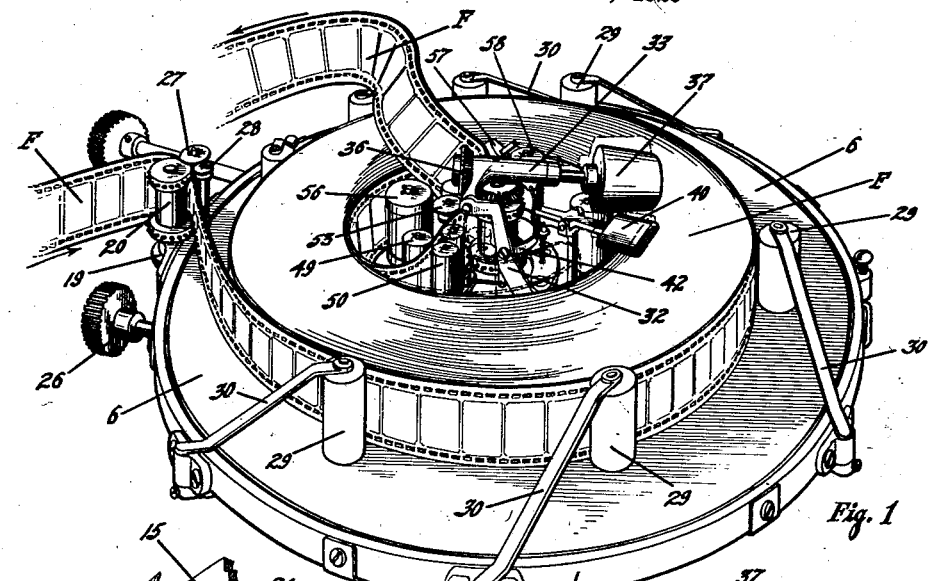
Figure 1 is a perspective view of a film reel in which my invention is shown in one form or embodiment.

Mounted on the flat member, 45, which is pivoted on the fixed center table, 7ª, are three vertical guide rollers, 49, 50 and 51, moving as a unit with said member, 45, and through which the film, F, is directed as it leaves the inner circle or convolution of the reel, as clearly seen in Fig. 1. The film passes between roller 49, and the two rollers, 50 and 51, and thence between two rollers, 52 and 53, and the film sprocket, 11, said rolls, 52 and 53, serving to hold the film in proper engagement with said film sprocket, 11, and being mounted on the free end of a spring supporting member, 54, held normally up to the film sprocket by means of a spring latch, 55, the free end of which is adapted to be slightly depressed, so as to permit the supporting member, 54, and said rollers, 52 and 53, to be moved away from the film sprocket, 11, as indicated in light broken lines in Fig. 5, to permit the placing of the film thereon.

Mounted on said center table, 7ª, is a guide or guard roller, 56, around which the inner convolution of the film, F, moves, as seen in Fig. 1, before it loops between the rollers 49 and 50, on its way to the film sprocket, 11. An inclined roller, 57, is also provided in the path of the film as it comes from said film sprocket, 11, and is directed upwardly over the body of the film, as will be clear from Fig. 1. Other guard rollers, as 58 and 59, are provided on said center table, around the inner circle of the film, as indicated for holding the inner convolution of the film free of the mechanism and for guiding it around to the rollers 49, 50 and 51, which direct it to the film sprocket, 11.

The use and operation of the invention may be briefly described as follows:

The film is placed upon the turntable, 6, the outer convolution being placed around the film sprocket, 20, the rollers, 27 and 28, being adjustable away from said sprocket for this purpose in a manner similar to the adjustment of rollers, 52 and 53, Fig. 5. The inner convolution of said film is then inserted edgewise down between 49 and 50, and then the rollers, 52 and 53, are moved away from the sprocket, 11, and said film inserted down between said rollers and said sprocket, whereupon said rollers 52 and 53 are moved against the film and the sprocket, 11, the spring latch, 55, holding it there. The film is placed up over the inclined roller, 57, and directed out over the body of the film reel and then to the machine in which it is to be used, usually below. Sufficient film is left in the loop which runs to the projecting machine to function properly and without pull on the film.

The invention functions as follows. If the turntable 6, and the body of the film reel is turning faster than the film is passing over sprocket, 11, the inner convolution will loop itself forwardly of the rollers, 49 and 50, as indicated in light broken lines in Fig. 1. This will move said rollers, 49, 50 and 51, on the member, 45, Fig. 3, with the result that it will rock the yoke, 42, and move the brake lever, 39, and the brake pad, 40, down upon the inner convolutions of the film, while moving the driving member, 37, away from the film. This braking action causes the forwardly moving loop to be taken up and the film to again assume the position indicated in full lines, Fig. 1. On the other hand, if said turntable, 6, and the reel of film, F, is moving too slowly, the drag on the inner convolution of the film will pull said rollers, 49, 50 and 51, backwardly, rock the yoke 42 downwardly, release or move the brake pad 40, upwardly, and move the friction drive element, 37, down upon the inner convolutions of the film, and as this is being driven from the central shaft, 8, and the gears, 12 and 36, it will feed the film forwardly by the driving contact with the edges of the inner convolutions of said film. Thus I have provided a practical and successful means for automatically regulating and controlling the feed of a film from a reel wherein the feed is from the inner circle of the reel and the take up is around the outer circle of said reel, making it possible to use continuously an endless film, the control being by means of applying either a drive or a brake action to the edge of the film, and while I have shown one practical form or embodiment of my invention on the accompanying drawings for illustrative purposes only, I am aware that changes in details of construction and arrangement can be made without departing from the spirit of the invention, and I do not, therefore, limit the invention to the showing made, except as I may be limited by the hereto appended claims.

I claim:

1. In combination, a turntable, a reel of film mounted thereon a brake element adapted to be moved into engagement with the edges of the convolutions of said film, a driving element adapted to be moved into engagement with the edges of the convolutions of said film for increasing its movement; and means controlled by the film for automatically operating said brake element or said driving element as said film increases its movement or slows up its movement.

2. In combination with a turntable, a reel of film mounted thereon, a brake element adapted to be moved against the film to retard its movement, a friction driving element adapted to be moved against said film to increase its movement, means controlled by the inner convolution of said film for automatically operating said brake element or said driving element as said film increases or slows up its movement.

3. In combination with a turntable and reel of film thereupon, means for controlling the movement of the film which includes a brake element adapted to be moved against the film, and operating means for said brake element, said operating means being moved by the inner convolution of said film.

4. In combination with a turntable and reel of film thereupon, means for controlling the movement of the film which includes a film driving element adapted to be moved into driving engagement with the film, and controlling means for said driving element, said controlling means being moved by the inner convolution of said film.

5. In combination with means for holding and driving an endless film including a central film sprocket, means for regulating the movement of said film, said means being adapted to be actuated by the movement of the film loop between the inner convolution of said film and the central film sprocket.

6. In combination, a turntable, a reel of film thereon, a central film sprocket means for driving the same, means within the inner circle of said film for guiding and directing the film from the inner circle thereof to said central sprocket, means for guiding and directing the returning film on to the outer circle thereof, means for automatically governing the speed of the inner convolutions of said film, said means including an element adapted to be moved into operating engagement with the edge of the film.

7. In combination, a film support, an endless film thereon, means for turning said support, said film being adapted to feed from the center and to return to the outer circumference thereof, means for driving said support and said film, means for regulating the movement of the film relative to the support, said means including an element adapted to be moved into and out of operating engagement with the edges of the convolutions of said film, and means whereby the inner convolution of the film operates said regulating means.

8. Means for holding and operating an endless reel of film including a fixed table, a turntable to receive the film around said fixed table, said reel of film feeding from the center and taking up around the outer circle thereof, and means mounted on said fixed table in the center of said reel for regulating the feed of said film from the center, said means including movable elements adapted to be moved into and out of engagement with the edges of the inner convolutions of the film.

9. Means for holding and operating an endless reel of film including a fixed table, a turntable to receive the film around said fixed table, said reel of film feeding from the center and taking up around the outer circle thereof, and means mounted on said fixed table in the center of said reel for regulating the feed of said film from the center, said means including a brake element and a driving element adapted to be moved alternately into and out of engagement with the edges of the inner convolutions of said film, means for actuating said regulating means as said film decreases or increases its movement from a normal movement, said actuating means being set into operation by the movement of the inner convolution of said film.

10. In combination with means for supporting and turning an endless reel of film, means for regulating the feed of said film from the center of said reel, said means including a brake element adapted to be moved against the film to retard its movement, a driving element adapted to be moved against the film to increase its movement, and means actuated by the movement of the inner convolution of said film for operating said brake element and said driving element.

11. In combination with means for supporting and turning an endless reel of film, means for regulating the feed of said film from the center of said reel, said means including a brake element adapted to be moved against the film to retard its movement, means for automatically operating said brake element as the speed of said film increases beyond normal, said means being controlled by the movement of the inner convolution of the film as it moves from the inner circle of said reel, and movable guide rollers through which said film moves as it leaves said inner circle, said movable guide rollers being connected to actuate said brake element.

12. In combination with means for supporting and turning an endless reel of film, a fixed table in the center of said reel, guide rollers movably mounted on said table and through which said film moves from the center of the reel, regulating means adapted to be moved into and out of operating engagement with the film, and connections whereby said movable guide rollers move said regulating means as the inner convolution of said film drags or loops forwardly, substantially as described.

13. In combination, a revoluble turntable to receive a reel of endless film thereupon, a central film sprocket for moving said film from the center out, guiding means within the inner convolution of said film upon said platform through which said film passes to said central film sprocket and means connected therewith and operable thereby for automatically controlling the speed of said film.

14. In combination, a revoluble turntable to receive a reel of endless film thereupon, a central sprocket for moving said film from the center out, guiding mechanism within the inner convolution of said film upon said platform for guiding said film to said sprocket, means actuated by the loop of said film for controlling the speed of the film as it moves from said reel, and means for feeding the returning film to the outside of said reel of film.

Signed at Pasadena, Los Angeles County, California, this 27th day of October, 1925.

CHARLES O. WINGREN.